(12) United States Patent
Sun et al.

(10) Patent No.: US 10,824,361 B2
(45) Date of Patent: Nov. 3, 2020

(54) CHANGING DATA RELIABILITY TYPE WITHIN A STORAGE SYSTEM

(71) Applicant: EMC IP Holding Company LLC, Hopkinton, MA (US)

(72) Inventors: Ree Sun, Beijing (CN); Jian Gao, Beijing (CN); Hongpo Gao, Beijing (CN); Baote Zhuo, Beijing (CN); Jamin Kang, Beijing (CN); Shaoqin Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 16/170,143

(22) Filed: Oct. 25, 2018

(65) Prior Publication Data

US 2019/0129643 A1 May 2, 2019

(30) Foreign Application Priority Data

Oct. 27, 2017 (CN) .......................... 2017 1 1027432

(51) Int. Cl.
*G06F 12/02* (2006.01)
*G06F 3/06* (2006.01)
*G06F 11/14* (2006.01)
*G06F 11/10* (2006.01)

(52) U.S. Cl.
CPC .......... *G06F 3/0644* (2013.01); *G06F 3/0614* (2013.01); *G06F 3/0632* (2013.01); *G06F 3/0661* (2013.01); *G06F 3/0689* (2013.01); *G06F 11/1084* (2013.01); *G06F 11/1092* (2013.01); *G06F 11/1458* (2013.01)

(58) Field of Classification Search
CPC ...... G06F 3/067; G06F 3/061; G06F 16/9014; G06F 16/90344
USPC ......................................................... 711/114
See application file for complete search history.

(56) References Cited

U.S. PATENT DOCUMENTS

| | | | | |
|---|---|---|---|---|
| 6,058,455 A | * | 5/2000 | Islam | G06F 11/1096 710/10 |
| 6,275,898 B1 | * | 8/2001 | DeKoning | G06F 3/0605 711/114 |

(Continued)

*Primary Examiner* — Titus Wong
(74) *Attorney, Agent, or Firm* — BainwoodHuang

(57) ABSTRACT

Implementations of the present disclosure relate to a method, system and computer program product for managing a storage system. Specifically, in one implementation of the present disclosure there is provided a method for managing a storage system. The storage system comprises at least one stripe, a stripe of the at least one stripe comprising multiple extents among which respective extents being from respective storage devices in a resource pool. The method comprises: in response to receiving a converting request to convert the storage system from a first type to a second type, determining a target storage device associated with the converting request in the resource pool; for a stripe of the at least one stripe, updating metadata associated with the stripe so as to remove from the stripe an extent that is located at the target storage device; and converting the storage system from the first type to the second type on the basis of the updated metadata. In other implementations of the present disclosure, there is provided a corresponding system and computer program product.

20 Claims, 12 Drawing Sheets

(56) References Cited

U.S. PATENT DOCUMENTS

| | | | | |
|---|---|---|---|---|
| 6,530,004 B1* | 3/2003 | King | G06F 11/1096 | 711/114 |
| 6,985,996 B1* | 1/2006 | Nagshain | G06F 11/1096 | 711/114 |
| 7,991,969 B1* | 8/2011 | Chatterjee | G06F 3/0605 | 707/781 |
| 8,479,211 B1* | 7/2013 | Marshall | G06F 16/134 | 718/104 |
| 9,514,014 B2 | 12/2016 | Webman et al. | | |
| 10,073,621 B1 | 9/2018 | Foley et al. | | |
| 10,346,220 B2 | 7/2019 | Liu et al. | | |
| 10,372,384 B2 | 8/2019 | Liu et al. | | |
| 10,496,483 B2 | 12/2019 | Xiao et al. | | |
| 2003/0120863 A1* | 6/2003 | Lee | G06F 11/1084 | 711/114 |
| 2005/0182992 A1* | 8/2005 | Land | G06F 3/0607 | 714/701 |
| 2005/0229023 A1* | 10/2005 | Lubbers | G06F 11/1076 | 714/6.1 |
| 2010/0031060 A1* | 2/2010 | Chew | G06F 21/80 | 713/193 |
| 2010/0083039 A1* | 4/2010 | Chew | G06F 11/1076 | 714/6.12 |
| 2010/0131706 A1* | 5/2010 | Bean | G06F 11/008 | 711/114 |
| 2010/0218039 A1* | 8/2010 | Brown | G06F 3/0613 | 714/6.12 |
| 2012/0311282 A1* | 12/2012 | Cannon | G06F 16/119 | 711/162 |
| 2013/0254480 A1* | 9/2013 | Chang | G06F 11/1084 | 711/114 |
| 2014/0250270 A1* | 9/2014 | Grube | G06F 11/1076 | 711/114 |
| 2016/0132396 A1* | 5/2016 | Kimmel | G06F 12/0246 | 714/6.3 |

* cited by examiner

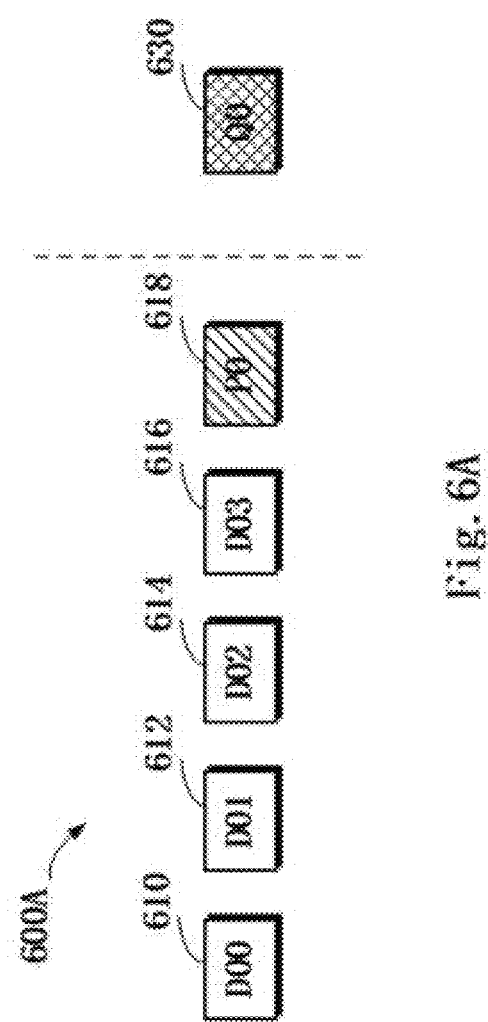

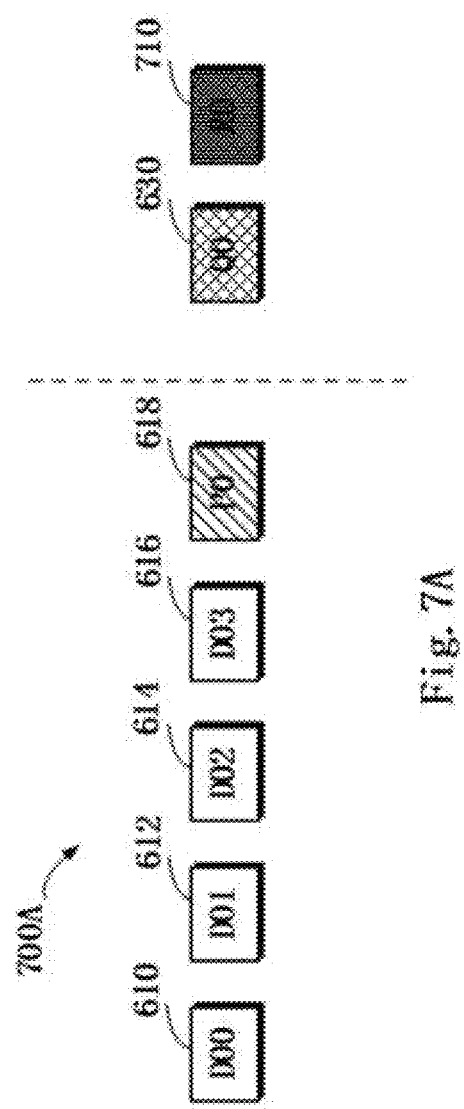

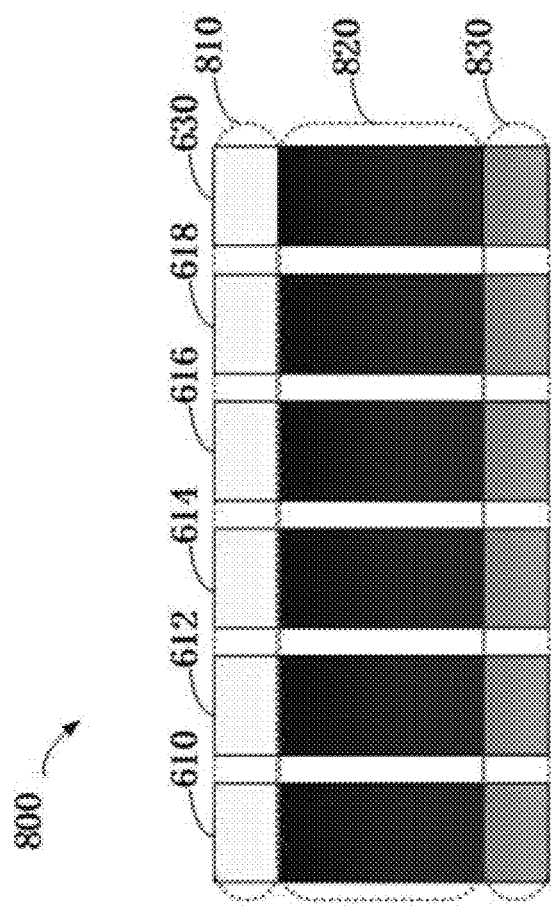

CHANGING DATA RELIABILITY TYPE WITHIN A STORAGE SYSTEM

RELATED APPLICATIONS

This application claim priority from Chinese Patent Application Number CN 201711027432.1, filed on Oct. 27, 2017 at the State Intellectual Property Office, China, titled "METHOD, SYSTEM AND COMPUTER PROGRAM PRODUCT FOR MANAGING STORAGE SYSTEM" the contents of which is herein incorporated by reference in its entirety.

FIELD

Various implementations of the present disclosure relate to storage management, and more specifically, to a method and system for managing a storage system (e.g. Redundant Array of Independent Disks (RAID)), as well as a computer program product.

BACKGROUND

With the development of data storage techniques, various data storage devices now provide users with higher and higher data storage capacity, and also their data access speed has been increased greatly. With the increase of data storage capacity, users also impose greater demands on data reliability and response time of storage systems. So far various data storage systems based on redundant arrays of disks have been developed for improving reliability of data. When one or more disks in a storage system fail(s), data in failed disk(s) can be recovered from other normal disk.

A mapped Redundant Array of Independent Disks has been developed so far. In this mapped RAID, a disk is a logical concept and may comprise multiple extents in a resource pool. Multiple extents comprised in one logical disk may be distributed across different physical storage devices. For multiple extents in one stripe of the mapped RAID, these extents may be distributed across different physical storage devices, so that when a physical storage device where one extent among the multiple extents is located fails, data may be recovered from a physical storage device where other extent is located. For the RAID, different security levels may be provided. At a lower security level, less space is required for storing parity data (e.g. storing P parity only); while at a higher security level, more space is required for storing parity data (e.g. P parity and Q parity).

The mapped RAID might need to be converted between different security levels during usage, for example, reduced from a higher security level to a lower security level. At this point, it becomes a difficult issue regarding how to perform such conversion in an easy and effective manner.

SUMMARY

Therefore, it is desirable to develop and implement a technical solution for managing a storage system more easily and reliably. It is desired that the technical solution can be compatible with existing storage systems and manage data in existing storage systems by changing various configurations of these storage systems.

According to one implementation of the present disclosure, there is provided a method for managing a storage system, the storage system comprising at least one stripe, a stripe of the at least one stripe comprising multiple extents among which respective extents being from respective storage devices in a resource pool. The method comprises: in response to receiving a converting request to convert the storage system from a first type to a second type, determining a target storage device associated with the converting request in the resource pool; for a stripe of the at least one stripe, updating metadata associated with the stripe so as to remove from the stripe an extent that is located at the target storage device; and converting the storage system from the first type to the second type on the basis of the updated metadata.

According to one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The storage system comprises at least one stripe, a stripe of the at least one stripe comprising multiple extents among which respective extents being from respective storage devices in a resource pool. The method comprises: in response to receiving a converting request to convert the storage system from a first type to a second type, determining a target storage device associated with the converting request in the resource pool; for a stripe of the at least one stripe, updating metadata associated with the stripe so as to remove from the stripe an extent that is located at the target storage device; and converting the storage system from the first type to the second type on the basis of the updated metadata.

According to one implementation of the present disclosure, there is provided an apparatus for managing a storage system. The storage system comprises at least one stripe, a stripe of the at least one stripe comprising multiple extents among which respective extents being from respective storage devices in a resource pool. The apparatus comprises: a determining module configured to, in response to receiving a converting request to convert the storage system from a first type to a second type, determine a target storage device associated with the converting request in the resource pool; an updating module configured to, for a stripe of the at least one stripe, update metadata associated with the stripe so as to remove from the stripe an extent that is located at the target storage device; and a converting module configured to convert the storage system from the first type to the second type on the basis of the updated metadata.

According to one implementation of the present disclosure, there are provided computer program instructions which, when executed by at least one processor, cause the at least one processor to execute a method for managing a storage system as described above.

With the technical solution of the present disclosure, where data copies in a storage system are reduced, the storage system may be converted from a first type to a second type more rapidly.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings:

FIG. 6A schematically illustrates a block diagram for converting one stripe in a storage system from a first type to a second type according to one implementation of the present disclosure;

FIG. 7A schematically illustrates a block diagram for converting one stripe in a storage system from a first type to a second type according to one implementation of the present disclosure;

FIG. 8 schematically illustrates a block diagram of a stripe in a storage system according to one implementation of the present disclosure.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
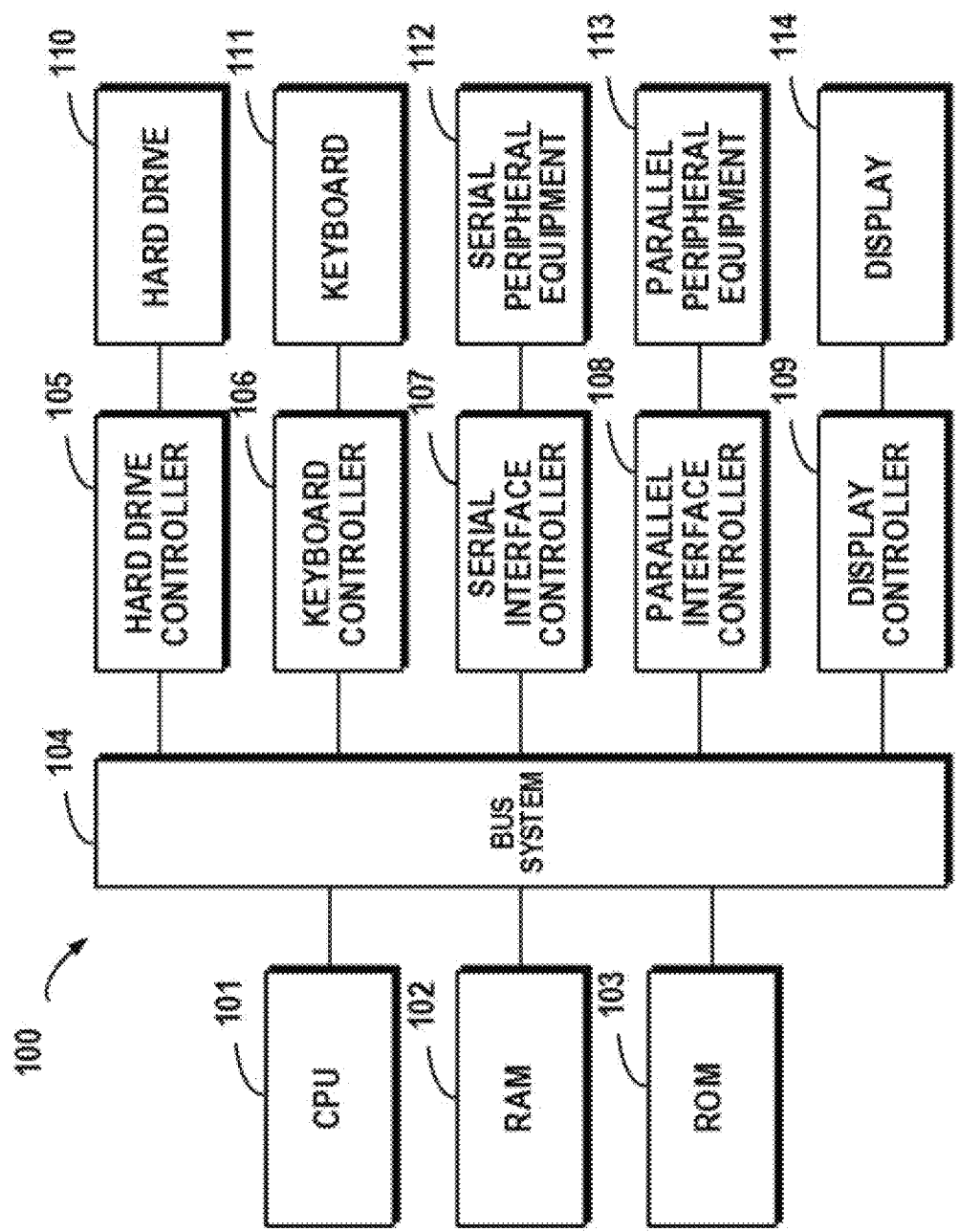
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In a storage system such as Redundant Array of Independent Disks (RAID), multiple storage devices (e.g. disks) may be combined into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
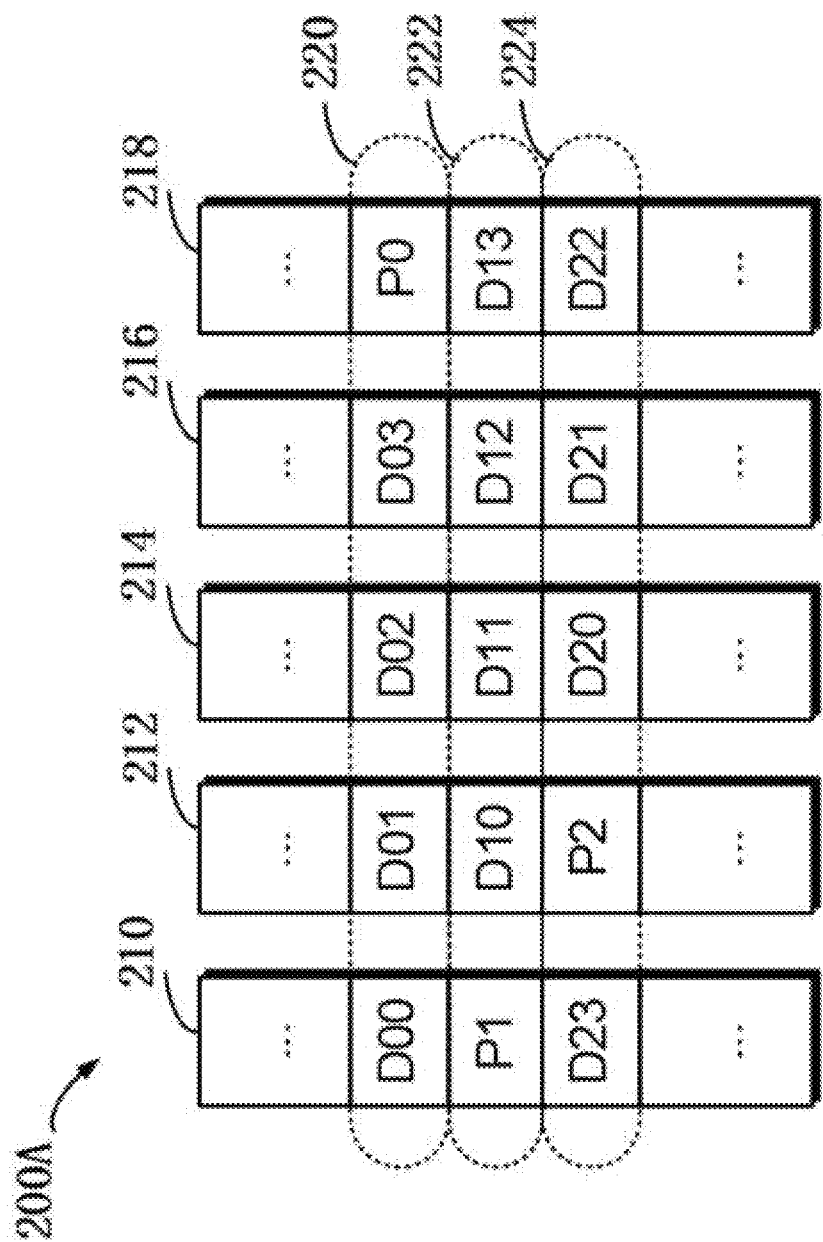
FIGS. 2A and 2B each schematically illustrate a view of an application environment where the implementations of the present disclosure may be implemented.

FIG. 2A schematically illustrates a schematic view 200A of a structure of RAID according to one technical solution. In this figure, working principles of RAID are illustrated by taking RAID-5 (4D+1P, where 4D represents that 4 storage devices are included in the storage system for storing data, and 1P represents that 1 storage device is included in the storage system for storing parity) that consists of five independent storage devices (210, 212, 214, 216 and 218) as an example. It should be noted although five storage devices are schematically shown in FIG. 2A, in other implementations more or less storage devices may be comprised according to different versions of RAID. Moreover, although in FIG. 2A there are shown stripes 220, 222 and 224, in other examples the RAID system may further comprise different numbers of stripes.

In RAID, one stripe crosses multiple physical storage devices (for example, the stripe 220 crosses storage the devices 210, 212, 214, 216 and 218). The stripe may be simply construed as a storage area among multiple storage devices which satisfies a given address range. Data stored in the stripe 220 comprises multiple parts: a data block D00 stored in the storage device 210, a data block D01 stored in the storage device 212, a data block D02 stored in the storage device 214, a data block D03 stored in the storage device 216, and a data block P0 stored in the storage device 218. In this example, data blocks D00, D01, D02 and D03 are stored data, and data block P0 is a parity of the stored data.

The mode of storing data in other stripes 222 and 224 is similar to that in the stripe 220, and the difference is that the parity about other data block may be stored in other storage device than the storage device 218. In this way, when one of the multiple storage devices 210, 212, 214, 216 and 218 fails, data in the failed device may be recovered from other normal storage devices.

Figure 2B:
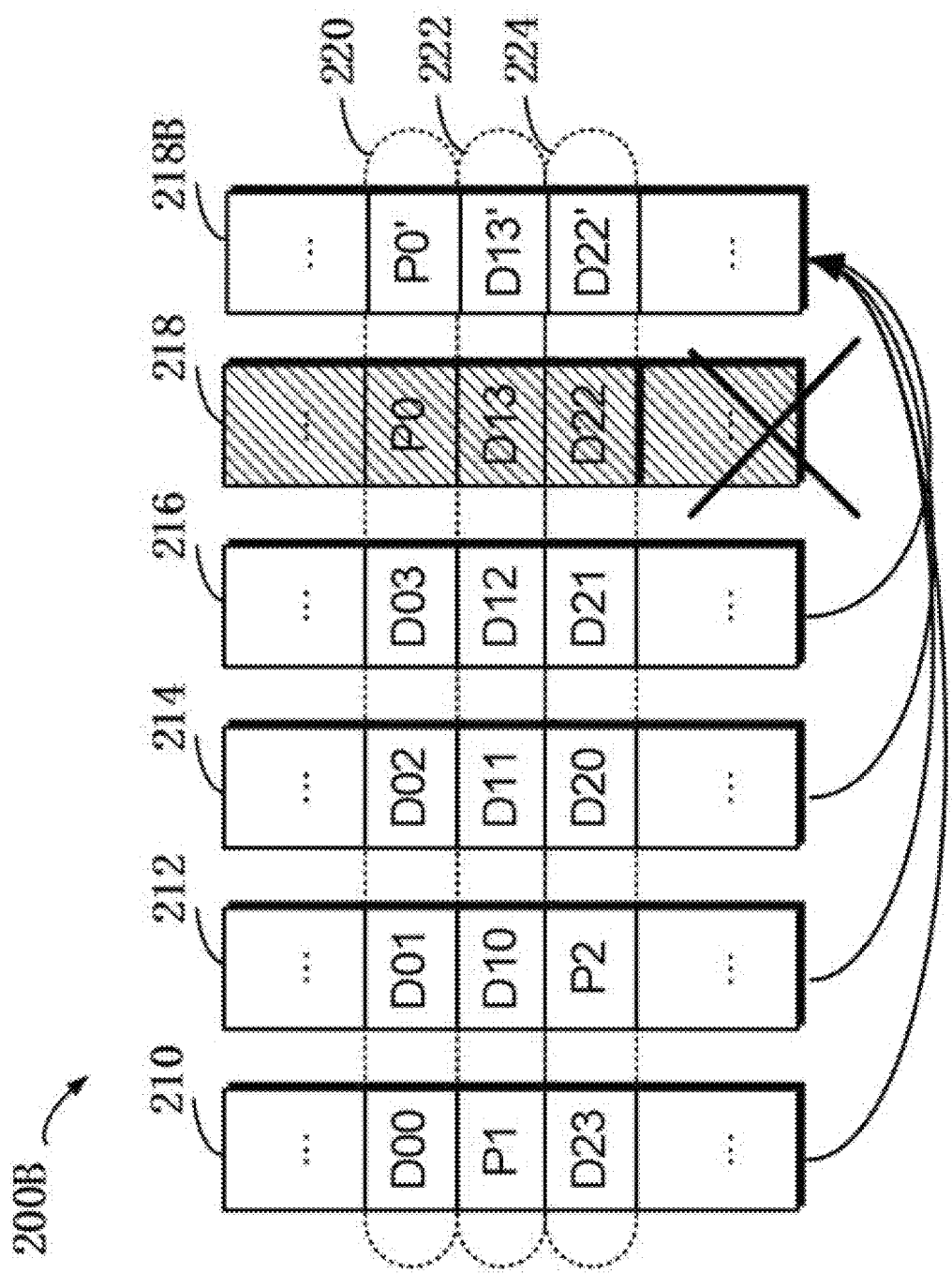

FIG. 2B schematically illustrates a schematic view 220B of rebuilding process of RAID according to one technical solution. As shown in FIG. 2B, when one storage device (e.g. the storage device 218 shown in shadow) fails, data may be recovered from the other storage devices 210, 212, 214 and 216 that operate normally. At this point, a new standby storage device 218 may be added to RAID to replace the storage device 218. In this way, recovered data may be written to the storage device 218, and system rebuilding may be realized. Though both the systems shown in FIGS. 2A and 2B use one storage device to store P parity (R5 RAID), in an R6 RAID system further two storage devices may be used to store P parity and Q parity respectively.

While a RAID-5 storage system comprising 5 storage devices (among which 4 storage devices are used for storing data and 1 storage device is used for storing parity) has been described with reference to FIGS. 2A and 2B, according to definition of other RAID levels, there may further exist a storage system comprising other number of storage devices. On the basis of definition of RAID 6, for example, two storage devices may be used to store parity P and Q respectively. For another example, according to definition of triple-parity RAID, three storage devices may be used to store parity P, Q and R respectively.

Figure 3:
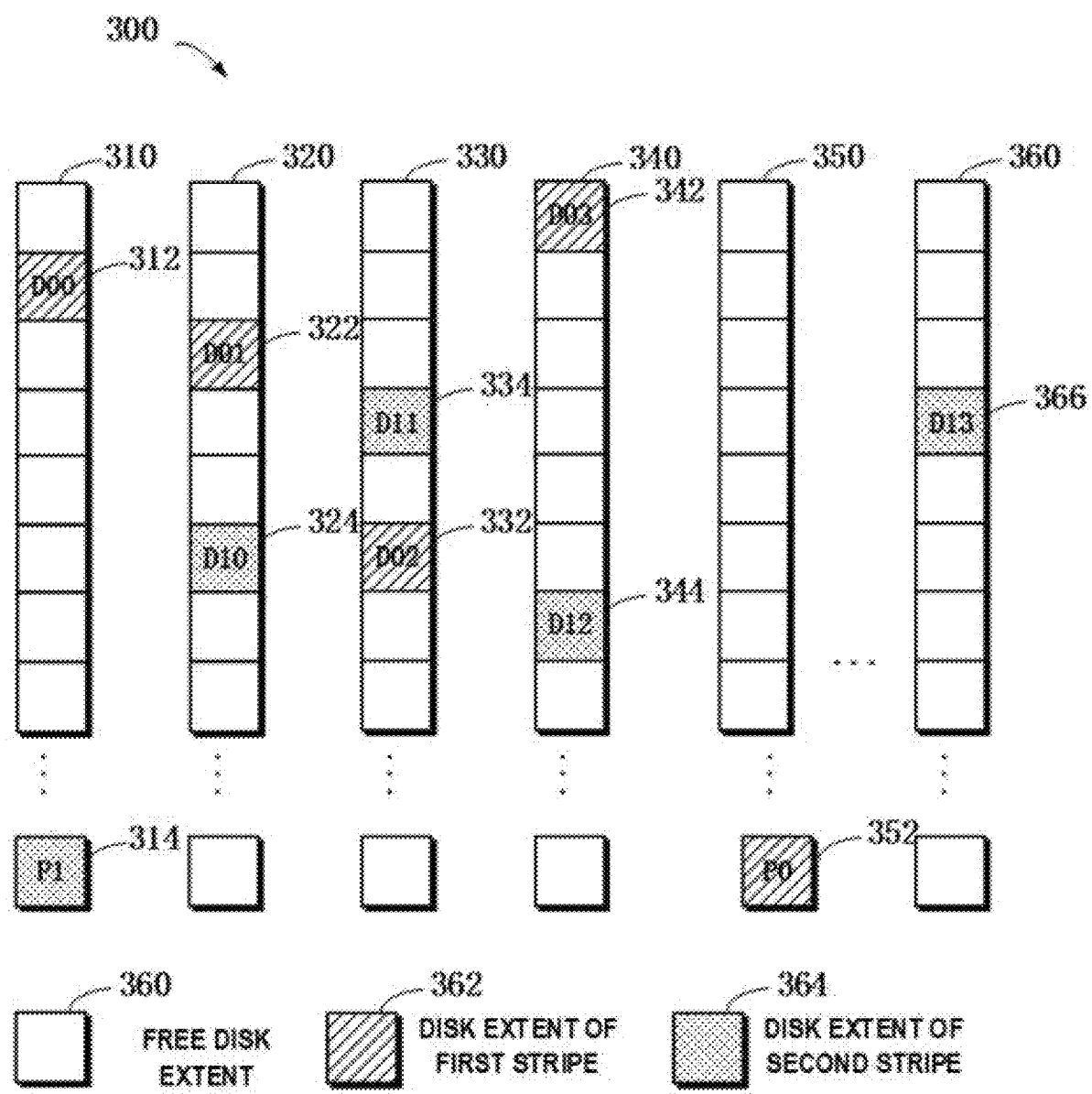
FIG. 3 schematically illustrates a block diagram of the distribution of extents in a mapped RAID storage system.

FIG. 3 schematically shows a block diagram 300 of the distribution of extents in a mapped RAID storage system. This figure illustrates multiple storage devices 310, 320, 330, 340, . . . , 350, 360. Each storage device may comprise multiple extents, wherein a blank extent 360 represents a free extent, an extent 362 shown with stripes represents an extent for a first stripe, and an extent 364 shown in shade represents an extent for a second stripe. At this point, extents 312, 322, 332, 342 and 352 for the first stripe are for storing data blocks D00, D01, D02, D03 and parity P0 of the first stripe respectively; extents 324, 334, 344, 366 and 314 for the second stripe are for storing blocks D10, D11, D12, D13 and parity P1 of the second stripe respectively.

Note in FIG. 3 the 4+1 R5 RAID storage system is taken as an example to illustrate how extents in various stripes are uniformly distributed over multiple storage systems in the resource pool. When RAID based on other level is used, those skilled in the art may implement concrete details based on the above described principles. For example, in the 4+2 RAID-6 storage system, the storage pool should at least comprise 6 storage devices. 6 extents in each stripe may be uniformly distributed over multiple storage devices so as to ensure a load balance between the multiple storage devices.

While a storage system is running, the storage system might need to be converted from a first type (e.g. RAID-6) with higher reliability to a second type (e.g. RAID-5) with lower reliability. For example, when it is detected the reliability of the storage system is too high or the storage space in the storage pool is insufficient, such a conversion may be performed.

A technical solution for conversion has been proposed. However, this technical solution needs to perform a large number of data copies within a storage system. If the storage system already has a large amount of data stored therein, data copies will take plenty of time, and further the operation of the storage system has to pause.

Figure 4:
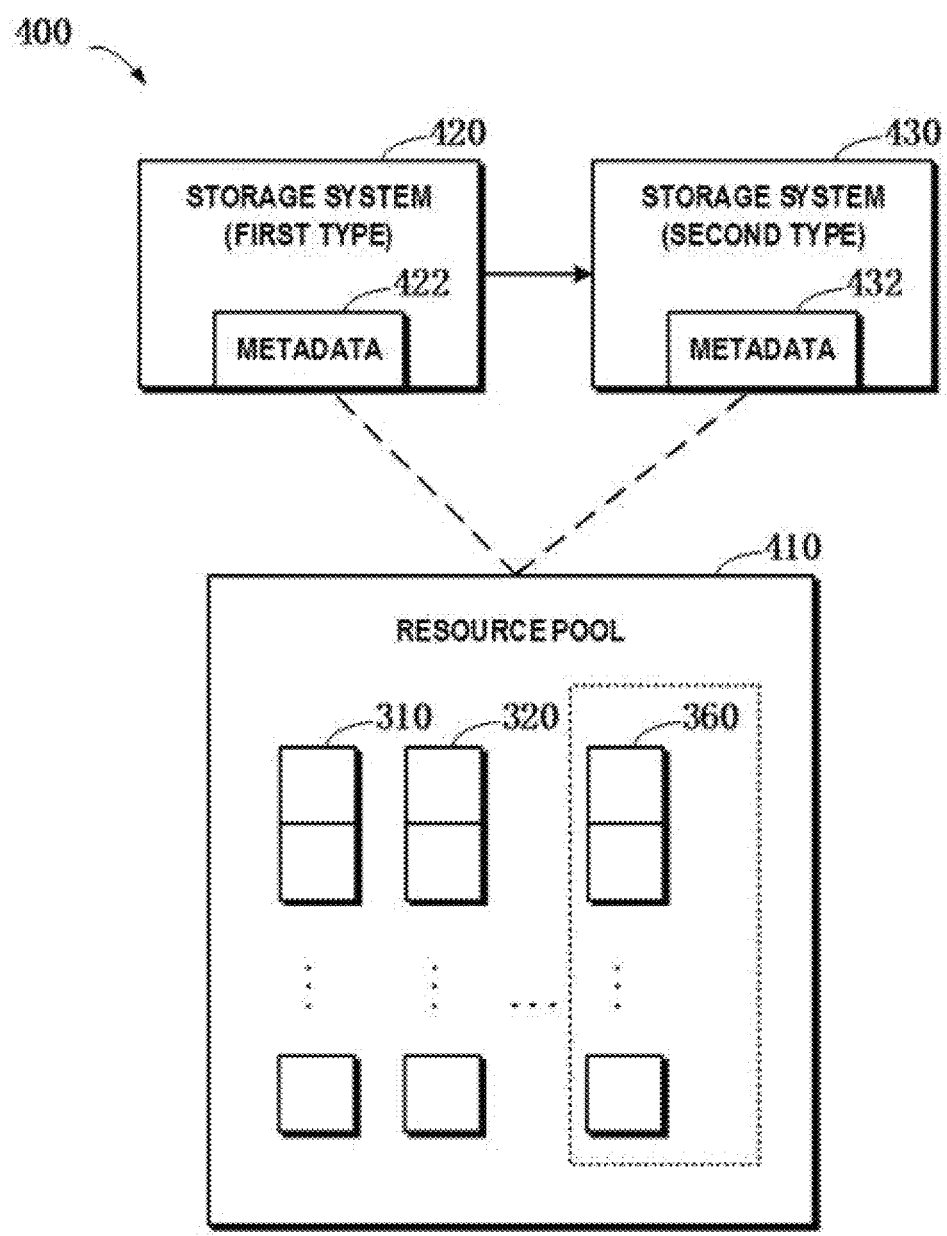
FIG. 4 schematically illustrates an architecture view for managing a storage system according to one implementation of the present disclosure.

To solve the foregoing drawbacks, the implementations of the present disclosure provide a method and apparatus for managing a storage system, as well as a program product. Specifically, according to one implementation of the present disclosure, there is provided a technical solution for managing a storage system. FIG. 4 schematically shows an architecture view 400 for managing a storage system according to one implementation of the present disclosure.

Specifically, the storage system comprises at least one stripe, a stripe of the at least one stripe comprising multiple extents among which respective extents being from respective storage devices in a resource pool. The method comprises: in response to receiving a converting request to convert the storage system from a first type to a second type, determining a target storage device associated with the converting request in the resource pool; for a stripe of the at least one stripe, updating metadata associated with the stripe so as to remove from the stripe extents located at the target storage device; and converting the storage system from the first type to the second type on the basis of the updated metadata.

As shown in FIG. 4, a storage system 420 may be a first type storage system (e.g. 4D+1P+1Q RAID-6), and a storage system 430 may be a second type storage system (e.g. 4D+1P RAID-5). When the storage system 420 is a mapped RAID shown in FIG. 3, extents to be comprised a stripe may be selected from a resource pool 410 comprising multiple storage devices 310, 320, . . . , 360. A mapping relationship between respective extents in the stripe and the respective storage devices 310, 320, . . . , 360 in the storage pool 410 may be comprised in metadata 422.

When it is desired to convert the first type storage system 420 to the second type storage system 430, without any extra data copy, the metadata 422 may be updated to updated metadata 432, and further the first type storage system 420 is converted to the second type storage system 430.

Figure 5:
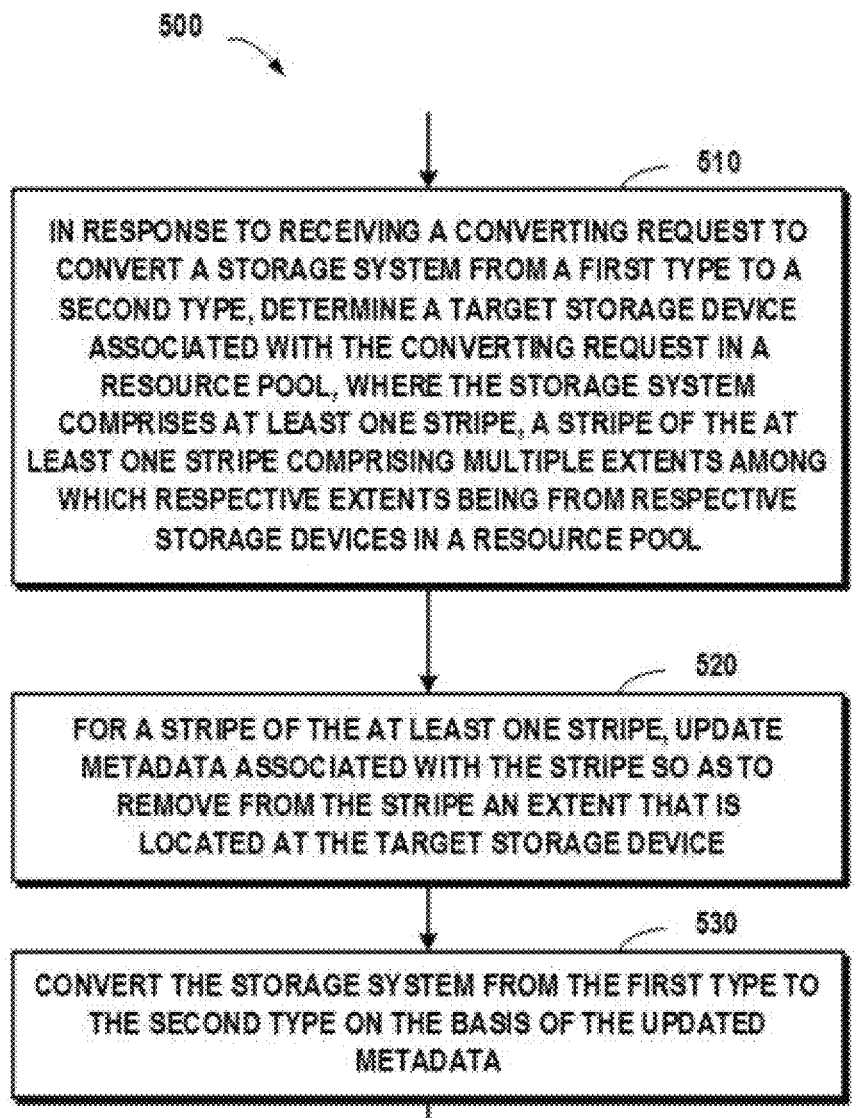
FIG. 5 schematically illustrates a flowchart of a method for managing a storage system according to one implementation of the present disclosure.

FIG. 5 schematically shows a flowchart of a method 500 for managing a storage system according to one implementation of the present disclosure. Specifically, the storage system is a mapped RAID and comprises at least one stripe. A stripe of the at least one stripe comprises multiple extents among which respective extents being from respective storage devices in a resource pool. At block 510, in response to receiving a converting request to convert the storage system from a first type to a second type, a target storage device associated with the converting request in the resource pool is determined. In this implementation, the converting request may specify which storage device in the resource pool is desired to be removed. For example, with reference to the resource pool 410 shown in FIG. 4, the converting request may specify the storage device 320 is to be removed. For another example, the converting request may not specify which storage device is to be removed, but may merely indicate RAID-6 is desired to be converted to RAID-5. At this point, any storage device may be selected as the target storage device from multiple storage devices where extents in stripes of the storage system 420 are located.

At block 520, for a stripe of the at least one stripe, metadata associated with the stripe is updated so as to remove from the stripe an extent located at the target storage device. As described above, in the mapped storage system, metadata in a stripe comprises a mapping relationship between respective extents in the stripe and respective storage devices in the resource pool 410. In this implementation, information associated with the target storage device may be removed from the metadata in the stripe.

According to one implementation of the present disclosure, first metadata recording configuration information on the stripe is obtained from the metadata, here the configuration information indicates a mapping relationship between a corresponding extent in the stripe and a corresponding storage device in the resource pool. Subsequently, the first metadata is updated on the basis of the target storage device so as to cause the configuration information to indicate the second type.

A structure of the metadata will be schematically described below. For example, the metadata may comprise a mapping table as shown in Table 1, and the table stores the position of each extent in the stripe (e.g. may be represented as a storage device's number an extent's number in the resource pool 410).

TABLE 1

Example of Mapping Table

| Number | D0 | D1 | D2 | D3 | P | Q | ... |
|--------|-----|-----|-----|-----|-----|-----|-----|
| 1 | N\|1 | 5\|6 | 0\|0 | 1\|2 | 3\|1 | 4\|3 | NULL NULL |
| ... | ... | ... | ... | ... | ... | ... | ... ... |

In the mapping table as shown in Table 1, the first column "Number" represents a stripe's number, at which point the second row in Table 1 represents this row is records of the first stripe in the storage system 420. D0, D1, D2 and D3 each represent data is stored in these extents, and the extents' positions are N|1, 5|6, 0|0 and 1|2 respectively. The value before "|" represents the number of a storage device where an extent is located, and the value after "|" represents an extent's number in the storage device. For example, "N|1" represents the extent is the 1$^{st}$ extent in the Nth storage device in the resource pool. Further, P and Q represent parity (P parity and Q parity) is stored in these extents, and the extents' positions are 3|1 and 4|3 respectively.

In this step, suppose it is determined from the converting request that the storage device is the 4$^{th}$ storage device (as shown by a shaded area in Table 1) in the resource pool 410, then at this point information associated with the 4$^{th}$ storage device may be removed from the mapping table as shown in Table 1. The updated mapping table is as shown in Table 2.

TABLE 2

Example of Updated Mapping Table

| Number | D0 | D1 | D2 | D3 | P | ... |
|--------|-----|-----|-----|-----|-----|-----|
| 1 | N\|1 | 5\|6 | 0\|0 | 1\|2 | 3\|1 | NULL NULL |
| ... | ... | ... | ... | ... | ... | ... ... |

At block 530, the storage system is converted from the first type to the second type on the basis of the updated metadata. Through the steps shown in the blocks 510 and 520, Table 2 no longer comprises information associated with the storage device storing Q parity. Thereby, the first stripe is successfully converted from a RAID-6 storage system to a RAID-5 storage system.

Figure 6B:
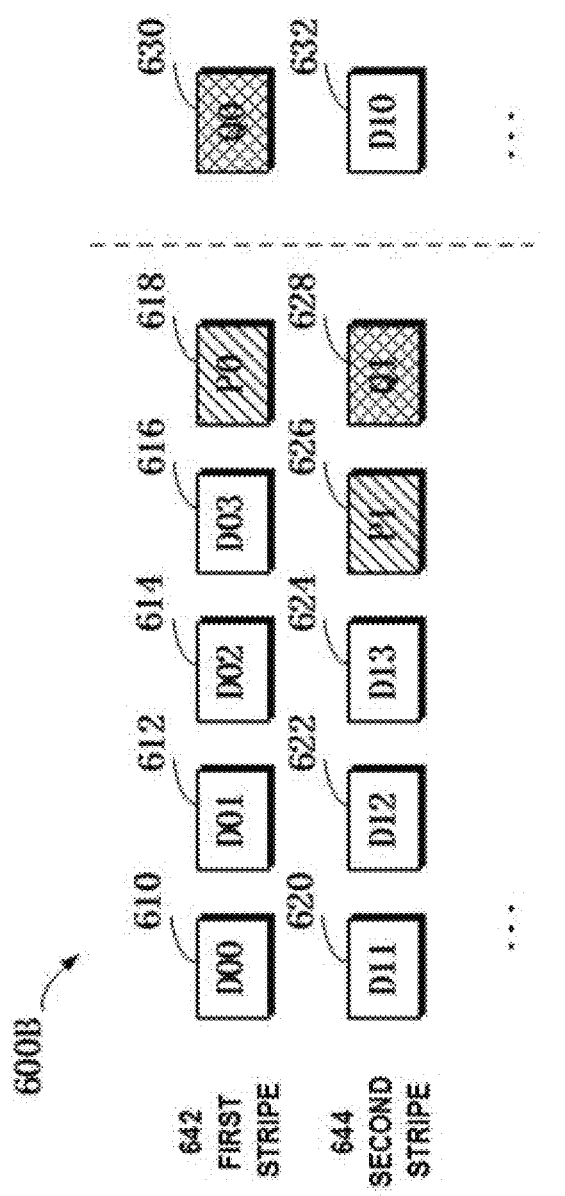
FIG. 6B schematically illustrates a block diagram for converting multiple stripes in a storage system from a first type to a second type according to one implementation of the present disclosure.

With reference to FIGS. 6A and 6B, a detailed description is presented below to how to convert various stripes in the storage system 420 from the first type to the second type. FIG. 6A schematically shows a block diagram 600A of converting one stripe in the storage system from the first type to the second type. As depicted, extents 610, 612, 614 and 616 store data D00, D01, D02 and D03 of a first stripe respectively, and extents 618 and 630 store parity P0 and Q0 of the first stripe respectively. At this point, if it is desirable to remove a target storage device where the extent 630 is located, then information associated with the target storage device may be directly removed from the mapping table.

FIG. 6B schematically shows a block diagram 600B of converting multiple stripes in the storage system from the first type to the second type. As depicted, operations on the first stripe 642 are similar to the description with reference to FIG. 6A and thus are ignored here. For a second stripe 644, extents 622, 624, 626 and 628 store data D10, D11, D12 and D13 of the second stripe 644 respectively, and extents 632 and 620 store parity P1 and Q1 of the second stripe 644 respectively. Suppose at this point the extent 632 is at a target storage device desired to be removed, if information associated with the target storage device is directly removed from the mapping table (i.e. D10 is removed), then the updated second stripe 644 will only comprise the extents 620, 622 and 624 storing D11, D12 and D13 as well as the extents 626 and 628 storing P1 and Q1. At this point, the stripe does not comprise D10, and hence does not satisfy requirements of conventional RAID-5 but belongs to degraded RAID-5.

Note since the degraded RAID-5 is not a reliable stable state but has potential risks, rebuild operations have to be performed on the stripe. According to one implementation of the present disclosure, after updating metadata associated with the stripe, in response to the stripe being in degraded mode of the second type, the stripe is rebuilt so as to recover the stripe to normal mode of the second type.

A detailed description is presented below to how to determine whether a stripe is in normal mode or degraded mode. Specifically, an attribute of data in the removed extent located at the target storage device is determined on the basis of the mapping relationship and the target storage device. In response to the determined attribute not matching the second type, it is determined the stripe is in the degraded mode of the second type.

With reference to the second stripe 644 in FIG. 6B, since the extent 632 is located at the removed target storage device, it will be removed from the second stripe 644. As a result, the second stripe 644 will only comprise the extents 620, 622 and 624 storing D11, D12 and D13 as well as the extents 626 and 628 storing P1 and Q1. It is learned that the attributes of the extents 620, 622 and 624 (storing D11, D12 and D13 respectively) are "data;" the attribute of the extent 626 (storing parity P) is "parity P;" and the attribute of the extent 628 (storing parity Q) is "parity Q."

Note the conversion serves to convert the storage system from RAID-6 to RAID-5, it may be determined that desired attributes of extents associated with RAID-5 should be: 4 data extents (D10, D11, D12 and D13 for the second stripe 644) and 1 parity P extent (P1 for the second stripe 644). At this point it may be found that attributes of various extents in the second stripe 644 do not match the desired attributes, it may be determined that the second stripe 644 is in the degraded mode.

Note as a detailed description of operations to convert the storage system from RAID-6 to RAID-5 has been schematically illustrated above, in other implementations a further storage system may be converted from a first type with higher reliability to a second type with lower reliability. According to one implementation of the present disclosure, the first type and the second type are selected from any of RAID5, RAID6 and triple parity, and the first type has higher reliability than the second type.

Figure 7B:
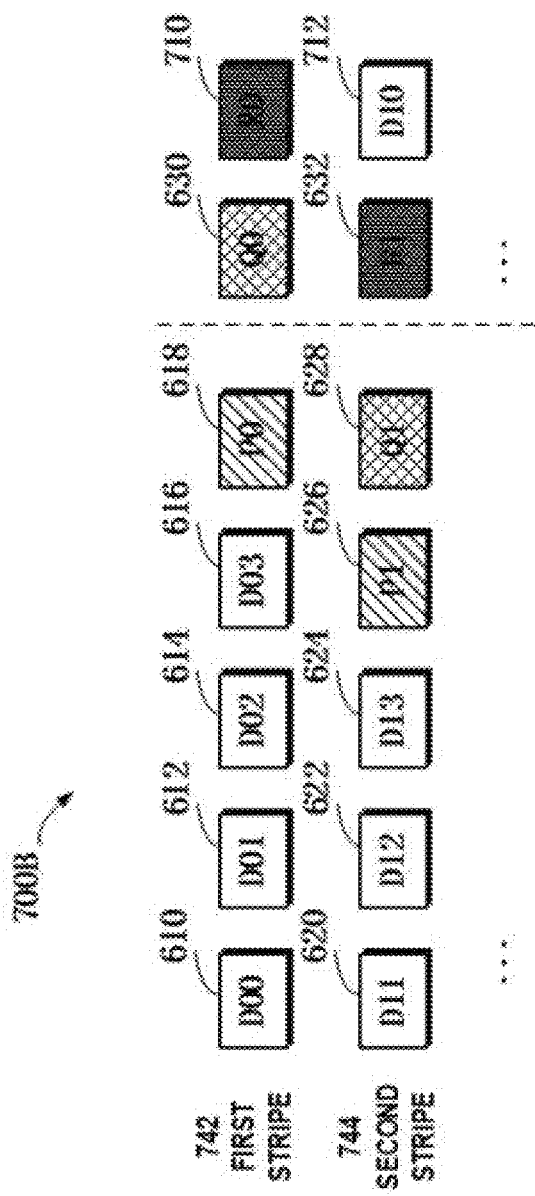
FIG. 7B schematically illustrates a block diagram for converting multiple stripes in a storage system from a first type to a second type according to one implementation of the present disclosure.

With reference to FIGS. 7A and 7B, description is presented below to how to convert a triple parity-based storage system to a RAID-5 storage system. FIG. 7A schematically shows a block diagram 700A of converting one stripe in the storage system from a first type (triple parity) to a second type (RAID-5). As depicted, extents 610, 612, 614 and 616 store data D00, D01, D02 and D03 of a first stripe respectively, and extents 618, 630 and 710 store parity P0, Q0 and R0 of the first stripe respectively. At this point, if it is desirable to remove target storage device where the extents 630 and 710 are located, then information associated with the two target storage devices may be directly removed from the mapping table.

FIG. 7B schematically shows a block diagram 700B of converting multiple stripes in the storage system from a first type (triple parity) to a second type (RAID-5). As depicted, operations on the first stripe 742 are similar to the description with reference to FIG. 7A and thus are ignored here. For a second stripe 744, extents 712, 622, 624 and 626 store data D10, D11, D12 and D13 of the second stripe 744 respectively, and extents 626, 628 and 632 store parity P1, Q1 and R1 of the second stripe 744 respectively. Suppose at this point the extents are located at two different target storage devices that are desired to be removed, if information associated with the two target storage devices is directly removed from the mapping table (i.e. P1 and Q1 are removed), then the updated second stripe 744 will only comprise the extents 620, 622 and 624 storing D11, D12 and D13 as well as the extents 626 and 628 storing P1 and Q1. At this point, the stripe does not comprise D10, and hence does not satisfy requirements of conventional RAID-5 but belongs to degraded RAID-5. Based on the method described above, rebuild operations should be performed on the second stripe 744.

With reference to FIG. 8, description is presented below to information associated with a stripe. Specifically, FIG. 8 schematically shows a block diagram 800 of the spatial layout of a stripe in a storage system according to one implementation of the present disclosure. In particular, FIG. 8 shows a schematic view of the spatial layout of a stripe of a first type (i.e. RAID-6) storage system. As depicted in FIG. 8, the stripe may comprise six extents 610, 612, 614, 616, 618 and 630. According to one implementation of the present disclosure, the stripe's entire space may be split into three regions 810, 820 and 830.

For example, the first metadata may be stored in the region 810 (i.e. at the top of each extent), data (such as user data or parity information described above) may be stored in the region 820 (i.e. in the middle of each region), and the second metadata may be stored in the region 830 (i.e. at the bottom of each region).

Additionally or alternatively, according to one implementation of the present disclosure, the first metadata may be stored at the top of each extent in a mirrored fashion, i.e. the first metadata stored in each extent of the stripe remains the same. Since the first metadata is usually small, according to one implementation of the present disclosure, when the storage system starts up, the first metadata may be pre-loaded so as to improve the subsequent access speed.

According to one implementation of the present disclosure, user data and parity information may be stored in the region 820 in RAID-6 way (e.g. 4D+1P+1Q), and the second metadata may also be stored in the region 830 in a way similar to the data region. That is, the second metadata may also be stored at the bottom of each extent in RAID-6 way of 4D+1P+1Q.

According to one implementation of the present disclosure, the size of a region for storing data in each extent may be predefined. Additionally or alternatively, according to one implementation of the present disclosure, the size of a region for storing the first metadata and/or the second metadata in each extent may be determined on the basis of the spatial size of the stripe.

According to one implementation of the present disclosure, for each RAID stripe in the storage system, the metadata may comprise: first metadata for recording configuration information on the RAID stripe; and second metadata for recording state information on the RAID stripe.

For example, Table 3 schematically shows an example of the data structure of the first metadata, and Table 4 schematically shows an example of the data structure of the second metadata. As seen from Table 3 and Table 4, the first metadata records basic configuration information associated with the type (e.g. RAID 5) of the stripe, and the second metadata records information associated with rebuild on the stripe.

TABLE 3

Example of Data Structure of First Metadata

| Field | Meanings |
|---|---|
| Valid bit | Indicating whether the first metadata is valid or not |
| LUN ID | Indicating the ID of a LUN to which this RAID stripe belongs |
| RAID ID | Indicating the id of RAID to which this RAID stripe belongs |
| RAID type | Indicating the raid protect level (e.g. RAID 6, etc.) of this RAID stripe |
| Width | Indicating the number (e.g. 5) of disk extents comprised in this RAID stripe |
| Disk extent size | Indicating the size of each disk extent in this RAID stripe (e.g. the number of storage blocks comprised in each disk extent) |
| Mapping table | Indicating a mapping relationship between this RAID stripe and a disk extent (e.g. the mapping tables shown in Table 1 and Table 2 above) |

TABLE 4

Example of Data Structure of Second Metadata

| Field | Meanings |
|---|---|
| Valid bit | Indicating whether the second metadata is valid or not |
| Rebuild position | Indicating a mask of a disk extent which needs to be rebuilt, and/or other rebuild-related position information |
| Rebuild indicator | Indicating whether a rebuild is enabled or not |

Note the fields comprised by the first metadata and the second metadata as shown in Table 3 and Table 4 are merely for the illustration purpose and not intended to limit the scope of the present disclosure. According to one implementation of the present disclosure, the first metadata and/or the second metadata may further comprise an additional field that is not shown and/or omit a field that is shown, and the scope of the present disclosure is not limited in this regard.

According to one implementation of the present disclosure, the first metadata and the second metadata may be stored in a metadata region of a stripe, so that a processor for executing the method of the present disclosure may obtain from the metadata region of the stripe the first metadata and the second metadata associated with the stripe.

While specific details of metadata of a stripe have been described above, a detailed description is presented below to how to perform rebuild operations on a stripe in degraded mode. According to one implementation of the present disclosure, second metadata recording state information on the stripe is obtained from the metadata, the state information being associated with a rebuild of the stripe. Subsequently, the second metadata is updated so as to enable the rebuild of the stripe.

According to one implementation of the present disclosure, the updating metadata associated with the stripe may further comprise updating the second metadata as shown in Table 4 so as to enable the rebuild procedure of the stripe. Returning to the example as shown in FIG. 6B, after information on the extent 632 is removed from the first metadata, the second stripe 644 only comprises the extents 620, 622 and 624 storing D11, D12 and D13 as well as the extents 626 and 628 storing P1 and Q1. For normal RAID-5, however, the stripe needs to store D01, D11, D12 and D13 as well as parity P1. At this point, D01 may be recovered on the basis of existing data in the second stripe 644 so as to complete the rebuild procedure. Specifically, the "rebuild indicator" in the second metadata of the stripe may be set to "true" so as to enable the rebuild of the stripe.

According to one implementation of the present disclosure, the rebuild procedure may proceed with the modification to the metadata. Additionally or alternatively, according to one implementation of the present disclosure, the rebuild procedure may be initiated as a background service. Through the rebuild procedure, for the second stripe 644 in FIG. 6B, data D01 may be rebuilt from data D11, D12 and D13 as well as parity P1.

According to one implementation of the present disclosure, in response to receiving an access request to the stripe, an execution of the access request to the storage system is delayed. For example, if an access request to the stripe is received before or during executing the method as shown in FIG. 5, then the access request may be queued so as to delay access to the stripe.

According to one implementation of the present disclosure, since the metadata only needs to be modified without any data copy, the conversion of the type of the storage system may be completed in a short time. Therefore, according to one implementation of the present disclosure, all access requests to the storage system may be queued. Subsequently, conversion operations may be performed on various stripes in the storage system.

Note it is not intended to limit in which order conversion operations on various stripes are performed. According to one implementation of the present disclosure, conversion operations may be performed on stripes in the storage system one by one. According to one implementation of the present disclosure, conversion operations may be concurrently performed on at least one part or all of the multiple stripes.

According to one implementation of the present disclosure, in response to the converting the storage system from the first type to the second type being completed, the delayed access request is sent to the storage system. At this point, since the conversion has been completed and the storage system has been converted from the first type to the second type, access requests that have been previously queued may be executed to the second type storage system as per a conventional method.

Additionally or alternatively, according to one implementation of the present disclosure, for a stripe in degraded mode, the degraded stripe still can normally serve access requests from users. In this manner, the implementations of the present disclosure may convert the type of the storage system without affecting user access as far as possible. At this point, the rebuild procedure may be implemented in background so as to reduce the interruption duration of the storage system.

According to one implementation of the present disclosure, in response to failure of any of the determining, the removing, the updating and the converting, the storage system is recovered to the first type. According to one implementation of the present disclosure, the method 500 may be executed in a transactional way so as to ensure atomicity of the entire conversion procedure. For example, in response to any of the foregoing operations failing, the storage system may rollback to the state before the method 500 is executed (i.e. the storage system may be recovered to the first type), so as to ensure its usability. In this manner, even if some operations fail during the conversion procedure, the usability of the entire storage system will not be affected according to the implementations of the present disclosure.

According to one implementation of the present disclosure, in response to the determining, the removing, the updating and the converting being successfully performed on each stripe of the at least one stripe, the target storage device is removed from the resource pool. In this implementation, if the conversion operation has been performed on each stripe in the storage system, then the target storage device may be removed from the resource pool. According to one implementation of the present disclosure, since the storage system in degraded mode comprise complete user data, the target storage device may be removed even when the storage system is in degraded mode. At this point, the rebuild procedure may be implemented in background so as to recover the storage system from the degraded mode to a normal mode.

According to one implementation of the present disclosure, the storage system may be converted from the first type (e.g. RAID-6) to the second type (e.g. RAID-5) by removing extents in the target storage device from each stripe in the storage system. Further, according to one implementation of the present disclosure, the conversion can be performed without affecting user access to the storage system as far as possible.

In addition, according to one implementation of the present disclosure, user data does not need to be migrated during the foregoing conversion procedure, so smaller system overheads (such as time and resource overheads, etc.) will be caused as compared with the conversion of the type of a storage system on the basis of traditional data copy technology.

In particular, according to one implementation of the present disclosure, the atomicity of the entire conversion procedure can be ensured using transactions, so the usability of the entire storage system will not be affected even if some operations fail during the conversion procedure.

Various implementations implementing the method of the present invention have been described above with reference to the accompanying drawings. Those skilled in the art may understand the method may be implemented in software, hardware or a combination of software and hardware. Moreover, those skilled in the art may understand by implementing various steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various implementations of the present invention. The apparatus described in the present invention comprises several means or modules, which are configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As a detailed and complete description has been presented above, it might be ignored below.

Figure 9:
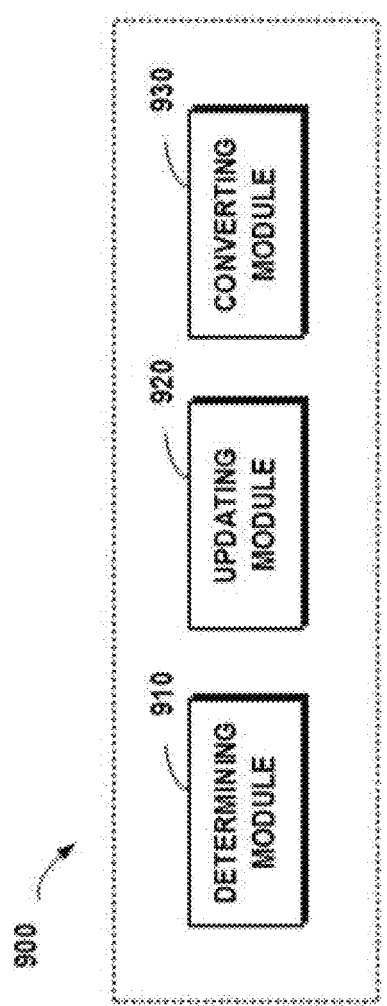
FIG. 9 schematically illustrates a block diagram of an apparatus for managing a storage system according to one implementation of the present disclosure.

FIG. 9 schematically shows a block diagram of an apparatus 900 for managing a storage system according to one implementation of the present disclosure. Specifically, the storage system comprises at least one stripe, a stripe of the at least one stripe comprising multiple extents among which respective extents being from respective storage devices in a resource pool. The apparatus 900 comprises: a determining module 910 configured to, in response to receiving a converting request to convert the storage system from a first type to a second type, determine a target storage device associated with the converting request in the resource pool; an updating module 920 configured to, for a stripe of the at least one stripe, update metadata associated with the stripe so as to remove from the stripe an extent that is located at the target storage device; and a converting module 930 configured to convert the storage system from the first type to the second type on the basis of the updated metadata.

According to one implementation of the present disclosure, the apparatus 900 further comprises: an obtaining module configured to obtain from the metadata first metadata recording configuration information on the stripe, the configuration information indicating a mapping relationship between respective extents in the stripe and respective storage devices in the resource pool; and an updating module configured to update the first metadata on the basis of the target storage device so as to cause the configuration information to indicate the second type.

According to one implementation of the present disclosure, the converting module 930 is further configured to, after the updating metadata associated with the stripe, in response to determining the stripe is in a degraded mode of the second type, rebuild the stripe so as to recover the stripe to a normal mode of the second type.

According to one implementation of the present disclosure, the first metadata further comprises a mapping relationship between the stripe and multiple storage devices in the resource pool, and the converting module is further configured to determine, on the basis of the mapping relationship and the target storage device, an attribute of data in the removed extent that is located at the target storage device; and in response to the attribute not matching the second type, determine the stripe is in the degraded mode of the second type.

According to one implementation of the present disclosure, the converting module 930 is further configured to obtain from the metadata second metadata recording state information on the stripe, the state information being associated with a rebuild of the stripe; and update the second metadata so as to enable the rebuild of the stripe.

According to one implementation of the present disclosure, the apparatus 900 further comprises: a delay module configured to, in response to receiving an access request to the stripe, delay an execution of the access request to the storage system.

According to one implementation of the present disclosure, the apparatus 900 further comprises: a sending module configured to, in response to the conversion of the storage system from the first type to the second type being completed, send the delayed access request to the storage system.

According to one implementation of the present disclosure, the apparatus 900 further comprises: a recovery module configured to, in response to any of the determining, the removing, the updating and the converting failing, recover the storage system to the first type.

According to one implementation of the present disclosure, the apparatus 900 further comprises: a removing module configured to, in response to the determining, the removing, the updating and the converting being successfully performed to each stripe of the at least one stripe, remove the target storage device from the resource pool.

According to one implementation of the present disclosure, the first type and the second type are selected from any of RAID 5, RAID 6 and triple parity, and the first type has a higher reliability than the second type.

According to one implementation of the present disclosure, there is provided a method for managing a storage system, the storage system comprising at least one stripe, a stripe of the at least one stripe comprising multiple extents among which respective extents being from respective storage devices in a resource pool. The method comprising: in response to receiving a converting request to convert the storage system from a first type to a second type, determining a target storage device associated with the converting request in the resource pool; for a stripe of the at least one stripe, updating metadata associated with the stripe so as to remove from the stripe an extent that is located at the target storage device; and converting the storage system from the first type to the second type on the basis of the updated metadata.

According to one implementation of the present disclosure, the method further comprises: obtaining from the metadata first metadata recording configuration information on the stripe, the configuration information indicating a mapping relationship between a corresponding extent in the stripe and a corresponding storage device in the resource pool; and updating the first metadata on the basis of the target storage device so as to cause the configuration information to indicate the second type.

According to one implementation of the present disclosure, the converting the storage system from the first type to the second type comprises: after the updating metadata associated with the stripe, in response to determining the stripe is in a degraded mode of the second type, rebuilding the stripe so as to recover the stripe to a normal mode of the second type.

According to one implementation of the present disclosure, the first metadata further comprises a mapping relationship between the stripe and multiple storage devices in the resource pool, and the determining the stripe is in a degraded mode of the second type further comprises: determining, on the basis of the mapping relationship and the target storage device, an attribute of data in the removed extent that is located at the target storage device; and in response to the attribute not matching the second type, determining the stripe is in the degraded mode of the second type.

According to one implementation of the present disclosure, the rebuilding the stripe so as to convert the stripe to a normal mode of the second type comprises: obtaining from the metadata second metadata recording state information on the stripe, the state information being associated with a rebuild of the stripe; and updating the second metadata so as to enable the rebuild of the stripe.

According to one implementation of the present disclosure, the method further comprises: in response to receiving an access request to the stripe, delaying the execution of the access request to the storage system.

According to one implementation of the present disclosure, the method further comprises: in response to the conversion of the storage system from the first type to the second type being completed, sending the delayed access request to the storage system.

According to one implementation of the present disclosure, the method further comprises: in response to any of the determining, the removing, the updating and the converting failing, recovering the storage system to the first type.

According to one implementation of the present disclosure, the method further comprises: in response to the determining, the removing, the updating and the converting being successfully performed to each stripe of the at least one stripe, removing the target storage device from the resource pool.

According to one implementation of the present disclosure, the first type and the second type are selected from any of RAID 5, RAID 6 and triple parity, and the first type has a higher reliability than the second type.

In one implementation of the present disclosure, there is provided a system for managing a storage system, comprising: one or more processors; a memory coupled to at least one processor of the one or more processors; computer program instructions stored in the memory which, when executed by the at least one processor, cause the system to execute a method for managing a storage system. The storage system comprises at least one stripe, a stripe of the at least one stripe comprising multiple extents among which respective extents being from respective storage devices in a resource pool. The method comprises: in response to receiving a converting request to convert the storage system from a first type to a second type, determining a target storage device associated with the converting request in the resource pool; for a stripe of the at least one stripe, updating metadata associated with the stripe so as to remove from the stripe an extent that is located at the target storage device; and converting the storage system from the first type to the second type on the basis of the updated metadata.

According to one implementation of the present disclosure, the method further comprises: obtaining from the metadata first metadata recording configuration information on the stripe, the configuration information indicating a mapping relationship between a corresponding extent in the stripe and a corresponding storage device in the resource pool; and updating the first metadata on the basis of the target storage device so as to cause the configuration information to indicate the second type.

According to one implementation of the present disclosure, the converting the storage system from the first type to the second type comprises: after the updating metadata associated with the stripe, in response to determining the stripe is in a degraded mode of the second type, rebuilding the stripe so as to recover the stripe to a normal mode of the second type.

According to one implementation of the present disclosure, the first metadata further comprises a mapping relationship between the stripe and multiple storage devices in the resource pool, and the determining the stripe is in a degraded mode of the second type further comprises: determining, on the basis of the mapping relationship and the target storage device, an attribute of data in the removed extent that is located at the target storage device; and in response to the attribute not matching the second type, determining the stripe is in the degraded mode of the second type.

According to one implementation of the present disclosure, the rebuilding the stripe so as to convert the stripe to a normal mode of the second type comprises: obtaining from the metadata second metadata recording state information on the stripe, the state information being associated with a rebuild of the stripe; and updating the second metadata so as to enable the rebuild of the stripe.

According to one implementation of the present disclosure, the method further comprises: in response to receiving an access request to the stripe, delaying an execution of the access request to the storage system.

According to one implementation of the present disclosure, the method further comprises: in response to the conversion of the storage system from the first type to the second type being completed, sending the delayed access request to the storage system.

According to one implementation of the present disclosure, the method further comprises: in response to any of the determining, the removing, the updating and the converting failing, recovering the storage system to the first type.

According to one implementation of the present disclosure, the method further comprises: in response to the determining, the removing, the updating and the converting being successfully performed to each stripe of the at least one stripe, removing the target storage device from the resource pool.

According to one implementation of the present disclosure, the first type and the second type are selected from any of RAID 5, RAID 6 and triple parity, and the first type has a higher reliability than the second type.

In one implementation of the present disclosure, there is provided a computer program product tangibly stored on a non-transient computer readable medium and comprising machine executable instructions which, when executed, cause the machine to execute the steps of any method as described above.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, the storage system comprising at least one stripe, a stripe of the at least one stripe comprising multiple extents among which respective extents being from respective storage devices in a resource pool, the method comprising:
    in response to receiving a converting request to convert the storage system from a first type to a second type, determining a target storage device associated with the converting request in the resource pool;
    for a stripe of the at least one stripe, updating metadata associated with the stripe so as to remove from the stripe an extent that is located at the target storage device; and
    converting the storage system from the first type to the second type on the basis of the updated metadata;
    wherein converting the storage system from the first type to the second type comprises:
        after the updating metadata associated with the stripe, in response to determining the stripe is in a degraded mode of the second type, rebuilding the stripe so as to recover the stripe to a normal mode of the second type.

2. The method according to claim 1, further comprising:
    obtaining from the metadata first metadata recording configuration information on the stripe, the configuration information indicating a mapping relationship between respective extents in the stripe and respective storage devices in the resource pool; and
    updating the first metadata on the basis of the target storage device so as to cause the configuration information to indicate the second type.

3. The method according to claim 2, wherein the first metadata further comprises a mapping relationship between the stripe and multiple storage devices in the resource pool, and the determining the stripe is in a degraded mode of the second type further comprises:
    determining, on the basis of the mapping relationship and the target storage device, an attribute of data in the removed extent that is located at the target storage device; and
    in response to the attribute not matching the second type, determining the stripe is in the degraded mode of the second type.

4. The method according to claim 2, wherein the rebuilding the stripe so as to convert the stripe to a normal mode of the second type comprises:
    obtaining from the metadata second metadata recording state information on the stripe, the state information being associated with a rebuild of the stripe; and
    updating the second metadata so as to enable the rebuild of the stripe.

5. The method according to claim 1, further comprising:
    in response to receiving an access request to the stripe, delaying an execution of the access request to the storage system.

6. The method according to claim 5, further comprising:
    in response to the conversion of the storage system from the first type to the second type being completed, sending the delayed access request to the storage system.

7. The method according to claim 1, further comprising:
    in response to any of the determining, the removing, the updating and the converting failing, recovering the storage system to the first type.

8. The method according to claim 1, further comprising:
    in response to the determining, the removing, the updating and the converting being successfully performed to each stripe of the at least one stripe, removing the target storage device from the resource pool.

9. The method according to claim 1, wherein the first type is selected from any of RAID 5, RAID 6 and triple parity,
    wherein the second type is selected from any of RAID 5 and RAID 6, and
    wherein the first type has a higher reliability than the second type.

10. A system for managing a storage system, comprising:
    one or more processors;
    a memory coupled to at least one processor of the one or more processors;
    computer program instructions stored in the memory which, when executed by the at least one processor, cause the system to execute a method for managing a storage system, the storage system comprising at least one stripe, a stripe of the at least one stripe comprising multiple extents among which respective extents being from respective storage devices in a resource pool, the method comprising:
        in response to receiving a converting request to convert the storage system from a first type to a second type, determining a target storage device associated with the converting request in the resource pool;
        for a stripe of the at least one stripe, updating metadata associated with the stripe so as to remove from the stripe an extent that is located at the target storage device; and
        converting the storage system from the first type to the second type on the basis of the updated metadata;
    wherein converting the storage system from the first type to the second type comprises:
        after the updating metadata associated with the stripe, in response to determining the stripe is in a degraded mode of the second type, rebuilding the stripe so as to recover the stripe to a normal mode of the second type.

11. The system according to claim 10, wherein the method further comprises:
    obtaining from the metadata first metadata recording configuration information on the stripe, the configuration information indicating a mapping relationship between respective extents in the stripe and respective storage devices in the resource pool; and
    updating the first metadata on the basis of the target storage device so as to cause the configuration information to indicate the second type.

12. The system according to claim 11, wherein the first metadata further comprises a mapping relationship between the stripe and multiple storage devices in the resource pool, and the determining the stripe is in a degraded mode of the second type further comprises:
    determining, on the basis of the mapping relationship and the target storage device, an attribute of data in the removed extent that is located at the target storage device; and
    in response to the attribute not matching the second type, determining the stripe is in the degraded mode of the second type.

13. The system according to claim 11, wherein the rebuilding the stripe so as to convert the stripe to a normal mode of the second type comprises:
    obtaining from the metadata second metadata recording state information on the stripe, the state information being associated with a rebuild of the stripe; and
    updating the second metadata so as to enable the rebuild of the stripe.

14. The system according to claim 10, wherein the method further comprises:
    in response to receiving an access request to the stripe, delaying the execution of the access request to the storage system.

15. The system according to claim 14, wherein the method further comprises:
    in response to the conversion of the storage system from the first type to the second type being completed, sending the delayed access request to the storage system.

16. The system according to claim 10, wherein the method further comprises:
    in response to any of the determining, the removing, the updating and the converting failing, recovering the storage system to the first type.

17. The system according to claim 10, wherein the method further comprises:
    in response to the determining, the removing, the updating and the converting being successfully performed to each stripe of the at least one stripe, removing the target storage device from the resource pool.

18. The system according to claim 10, wherein the first type is selected from any of RAID 5, RAID 6 and triple parity,
    wherein the second type is selected from any of RAID 5 and RAID 6, and
    wherein the first type has a higher reliability than the second type.

19. The method according to claim 1, wherein rebuilding the stripe so as to recover the stripe to a normal mode of the second type:
    in response to the stripe transitioning from the normal mode to the degraded mode, rebuilding the extent that was removed from the stripe based on other extents of the stripe.

20. A computer program product having a non-transitory computer readable medium which stores a set of instructions to manage a storage system, the storage system comprising at least one stripe, a stripe of the at least one stripe comprising multiple extents among which respective extents being from respective storage devices in a resource pool; the set of instructions, when carried out by computerized circuitry, causing the computerized circuitry to perform a method of:

in response to receiving a converting request to convert the storage system from a first type to a second type, determining a target storage device associated with the converting request in the resource pool;

for a stripe of the at least one stripe, updating metadata associated with the stripe so as to remove from the stripe an extent that is located at the target storage device; and converting the storage system from the first type to the second type on the basis of the updated metadata;

wherein converting the storage system from the first type to the second type comprises:

after the updating metadata associated with the stripe, in response to determining the stripe is in a degraded mode of the second type, rebuilding the stripe so as to recover the stripe to a normal mode of the second type.

* * * * *